United States Patent Office 3,332,924
Patented July 25, 1967

3,332,924
HOMOGENEOUS POLYMERIZATION OF VINYL ETHERS IN THE PRESENCE OF A FRIEDEL-CRAFTS CATALYST AND AN ORGANIC NITRO COMPOUND
John F. Van de Castle and John R. Hooton, Westfield, and Francis P. Baldwin, Summit, N.J., assignors to Esso Research and Engineering Company, a corporation of Delaware
No Drawing. Filed Feb. 12, 1964, Ser. No. 344,176
12 Claims. (Cl. 260—91.1)

This invention relates to the polymerization of vinyl ethers. More particularly, it relates to the production of amorphous vinyl ether polymers by the use of a catalyst system comprising a Friedel-Crafts type catalyst complexed with an organic nitro compound in an aromatic solvent.

Polymerization of vinyl ethers by means of Friedel-Crafts catalysts is well known in the art. However, the polymers produced by this method are of a highly crystalline structure, which, though useful for many purposes, lack the necessary properties desirable for incorporation into rubbery products. It has now been discovered that, by polymerizing a vinyl ether in the presence of a Friedel-Crafts type catalyst, which has been complexed with an organic nitro compound in an aromatic solvent, a polymer is produced which, when compounded and cured, is an amorphous, highly ozone resistant elastomer.

Among ethers which may be polymerized in accordance with the process of this invention are those vinyl ethers having the general formula:

where R is selected from the group consisting of $C_1$ to $C_{20}$ alkyl, cycloalkyl, aryl, alkaryl, aralkyl and halogen-substituted analogues thereof. Examples of suitable ethers falling within the above definition are: methyl vinyl ether; ethyl vinyl ether; isopropyl vinyl ether; n-butyl vinyl ether; isobutyl vinyl ether; hexyl vinyl ether; 2-ethylhexyl vinyl ether; octyl vinyl ether; decyl vinyl ether; dodecyl vinyl ether; tetradecyl vinyl ether; octadecyl vinyl ether; 2-chloroethyl vinyl ether; 1-bromobutyl vinyl ether; 1-iodo-2-methylpropyl vinyl ether; 2-bromooctyl vinyl ether; 1-chlorodecyl vinyl ether; 1-iododecyl vinyl ether; 1-iodo heptyl vinyl ether and 1-chloro heptyl vinyl ether.

Other suitable vinyl ethers include: cyclopropyl vinyl ether; cyclobutyl vinyl ether; cyclopentyl vinyl ether; cyclohexyl vinyl ether; cycloheptyl vinyl ether; cyclooctyl vinyl ether; cyclododecyl vinyl ether; 2-iodo-cyclobutyl vinyl ether; 2-bromo-cyclohexyl vinyl ether; 2-chloro-cyclooctyl vinyl ether; phenyl vinyl ether; ortho-cresyl vinyl ether; meta-cresyl vinyl ether; alpha-naphthyl vinyl ether; betanaphthyl vinyl ether; benzyl vinyl ether; 4-chlorophenyl vinyl ether; 4-bromophenyl vinyl ether; 4-isopropyl phenyl vinyl ether; 4-butyl phenyl vinyl ether; 4-octyl phenyl vinyl ether; 3-chloro-4-isopropyl phenyl vinyl ether; 3-bromo-4-butyl phenyl vinyl ether; phenethyl vinyl ether; phenpentyl vinyl ether; phenoctyl vinyl ether; 4'-chloro-phenethyl vinyl ether and 4'-chloro-phenbutyl vinyl ether. The preferred monomers are isobutyl vinyl ether and 2-chloroethyl vinyl ether.

The catalysts utilized in the practice of this invention are the Friedel-Crafts type catalysts usually employed for vinyl ether polymerizations. Specific examples of the aforementioned catalysts include aluminum chloride, aluminum bromide, boron trifluoride, titanium tetrachloride, gallium trichloride and aluminum alkyl halides of the type $AlR_nX_{3-n}$, wherein X represents a halogen selected from the group consisting of chlorine and bromine, n is an integer from 1 to 2 and R represents an alkyl radical of about 1 to 8 carbon atoms; aluminum chloride is preferred.

Organic nitro compounds employed in the practice of this invention are for the most part those compounds having the general formula:

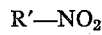

where R' is selected from the group consisting of $C_1$ to $C_{20}$ alkyl, cycloalkyl and aryl radicals. Examples of suitable organic nitro compounds are: nitromethane, nitroethane, nitrobutane, nitrohexane, nitrooctane, nitrodecane, nitrododecane, nitropentadecane, nitrooctadecane, nitrocyclohexane, nitrocyclopentane, nitrocyclododecane, nitrobenzene, o,m,p-nitrotoluene, nitrocumene, 3-nitro-o-xylene, 4-nitro-o-xylene, 2-nitro-m-xylene, 4-nitro-m-xylene, 5-nitro-m-xylene and 2-nitro-p-xylene. In addition, polynitro compounds as for example dinitro compounds, e.g., o,m,p-dinitrobenzene and 2,4-dinitrotoluene, may be utilized.

In preparing the catalyst complex of the instant invention, it has been further found that it is essential to use an aromatic solvent that is liquid at the polymerization temperature. Aromatic solvents suitable for use at or below $-50°$ C. include toluene, xylene, ethylbenzene, cumene, butylbenzene, amylbenzene and propylbenzene. When the polymerization is carried out above $-50°$ C., solvent such as chlorobenzene, 1,4-diethylbenzene, bromobenzene, 1,3-dichlorobenzene, 1,3-dimethoxybenzene, 1-ethyl-4-nitrobenzene, and fluorobenzene can be utilized. The preferred solvent is toluene. Aliphatic hydrocarbons, regardless of their freezing and boiling points, are not suitable for preparing the catalyst complex. However, they can be used as the polymerization solvent. Suitable aliphatic polymerization solvents are, for example, liquid or liquefied $C_1$ to $C_8$ hydrocarbons and mono and poly halogenated hydrocarbons such as methyl chloride, methyl bromide, trichloromethane, methylene chloride, ethyl bromide, ethyl chloride, 1,1-dichloroethane, perfluoroethane, 2,2-dibromopropane, propane, pentane, hexane, and n-heptane. It is believed that the active catalyst specie consists of a complex of the Friedel-Crafts type compound and the organic nitro compound, e.g., a complex of aluminum chloride and nitromethane.

In the practice of this invention, the complexed catalyst is prepared by simply pre-admixing the Friedel-Crafts type catalyst and the organic nitro compound in an aromatic solvent. In a preferred embodiment, aluminum chloride is admixed with nitromethane in a toluene solution. The mole ratio of Friedel-Crafts catalyst to organic nitro compound in the complexed catalyst is generally in the range of from about 0.1:1 to about 10:1, preferably about 1:1. In the case of polynitro compounds, it is desirable to have one mole of Friedel-Crafts catalyst for every nitro group present in the polynitro compound. For example, in the case of a dinitro compound, the mole ratio is desirably about 2:1. The concentration of the Friedel-Crafts catalyst and the organic nitro compound in the aromatic solvent is between about 0.001 molar and about 0.01 molar, preferably between about 0.01 and about 0.05 molar. The complexed catalyst can be conveniently prepared at temperatures between about 10° C. and about 40° C.

Polymerization is carried out in the conventional manner and under the typical conditions required for the polymerization of vinyl ethers. The monomer is dissolved in a solvent medium and placed in a suitable reaction vessel. The temperature is adjusted to between about $-100°$ C. and about room temperature (roughly 25° C.) preferably between about $-100°$ C. and about $-50°$ C. Sufficient catalyst solution is then introduced into the monomer diluent mixture to effect the desired conversion. For example, in a polymerization utilizing a 5% monomer :ed, a catalyst concentration of about 0.001 to about 0.1 molar, preferably about 0.005 to about 0.05 molar based on the total reactor mixture is used. In general, the amount of catalyst will vary from about 0.01 wt. percent to about wt. percent based on solvent and more desirably about .05 wt. percent to about 1 wt. percent. Similarly, monomer concentration should desirably range from about 1 to 10 wt. percent based on solvent.

Polymerization pressures may vary between atmospheric and about 1000 p.s.i., however, a range of about to about 5 p.s.i. is preferred. Reaction time can be from about 5 minutes to about 1 hour. When the reaction is completed or the desired conversion obtained, the polymer formed is isolated and recovered. This step can be accomplished, for example, by adding a sufficient amount of a conventional nonsolvent such as methyl alcohol to the reactor mixture to precipitate the polymer. The polymer is then dried according to normal practices.

The amorphous polymers formed by the practice of this process will range from a clear liquid to a white solid depending upon the molecular weight of the resulting polymer. In general, solution viscosity molecular weights will range from between about 3000 and about 1,000,000. Low polymerization temperatures as well as low catalyst concentrations favor the production of high molecular weight polymers, whereas high polymerization temperatures and high catalyst concentrations favor low molecular weight polymers. The high molecular weight polymers, e.g., 80,000–200,000, are oil resistant, ozone resistant and when compounded and cured are useful elastomeric compounds. Low molecular weight polymers, e.g. around 1000, are especially useful as coating materials.

Halogen-substituted vinyl ethers, e.g., 2-chloroethyl vinyl ether, can, after polymerization, be cured with hydrocarbon diamines such as putrescine, hexamethylene diamine, ethylene diamine, and phenylene diamine, to give an elastomer with desirable properties, e.g., high tensile strength and superior ozone resistance. If the monomer used is a hydrocarbon vinyl ether, the resulting polymer, e.g., polyisobutyl vinyl ether, can be modified by the cleavage of pendent alkoxy groups with halogen acids, e.g., hydroiodic and hydrobromic acids, to give a modified polymer containing about 1 to about 15 wt. percent halogen. This modified polymer can then be cured with a diamine to produce the aforementioned desirable elastomer product. Vulcanized products obtained from the cured amorphous polymers of the present invention can be used in the manufacture of fibers, surface coatings, impregnating agents, etc.

The practice of this invention is further illustrated by the following examples which are not intended to limit its scope.

EXAMPLE 1

Runs 1 to 7

In order to demonstrate the preparation of polyvinyl ethers and the function of the catalyst system, runs 1–7 were carried out under the following conditions.

A 500 ml., 4-neck glass flask equipped with a stirrer, thermometer, condenser and opening to permit introduction of liquid reagents was employed. A nitrogen blanket was used to avoid contamination by atmospheric oxygen and water vapor, and a dry ice-heptane bath was used to control the reaction temperature.

The complexed catalyst was prepared in a 500 ml. Erlenmeyer flask under a nitrogen atmosphere. 1.0 g. of anhydrous aluminum chloride and 1 ml. of nitromethane were added to 250 ml. of toluene. Upon standing, an intense, yellow homogeneous solution was formed.

The designated solvent shown in Table I, which was distilled from a lithium dispersion under a nitrogen atmosphere, was added to the reaction flask followed by the addition of the monomer. Agitation was begun and after about 15 minutes the reactor temperature reached about −75° C. The complexed catalyst was then added dropwise through a dropping funnel. The reactor mixture immediately began to thicken and the reactor temperature rose to −68° C. within a few minutes. During the following polymerization time, the reactor temperature was kept between about −73° C. and about −78° C. Thereafter a solution of 0.1 g. of phenyl-β-naphthylamine in 10 mls. of methyl alcohol was introduced to deactivate the catalyst. The reaction mixture was then poured into 2 liters of methyl alcohol to precipitate the polymer. The resulting product was dried in a vacuum oven (40° C. at 16 mm. Hg) for 12 hours. The data for runs 1–7 are listed in Table I.

TABLE I

| Run | 1 | 2 | 3 |
|---|---|---|---|
| Solvent, ml | Toluene, 230 | Toluene, 250 | Toluene, 250. |
| Monomer, ml | 2-chloroethyl vinyl ether, 21.0 | Isobutyl vinyl ether, 10.0 | Isobutyl vinyl ether, 10.0. |
| Temp., °C | −75 | −75 | −75. |
| Time, min | 30 | 60 | 60. |
| Catalyst, mmoles/liter | $AlCl_3 \cdot CH_3NO_2 \cdot$Toluene, 2.4 | $AlCl_3 \cdot CH_3NO_2 \cdot$Toluene, 30.0 | $AlCl_3 \cdot$Toluene, 30.0. |
| Polymer product, g | 22.0 | 4.1 | 4.4. |
| [¹] toluene, 23°C | 0.6 | 1.00 | 0.57. |
| Physical state [²] | | Amorphous | Crystalline. |

| Run | 4 | 5 | 6 | 7 |
|---|---|---|---|---|
| Solvent, ml | Toluene, 230 | n-Heptane, 230 | Toluene, 230 | n-Heptane, 230. |
| Monomer, ml | Isobutyl vinyl ether, 20 | Isobutyl vinyl ether, 20 | Isobutyl vinyl ether, 20 | 2-chloroethyl vinyl ether, 18.8. |
| Temp., °C | −75 | −75 | −75 | −75. |
| Time, min | 60 | 60 | 60 | 60. |
| Catalyst, mmoles/liter | $AlCl_3 \cdot CH_3NO_2 \cdot$Toluene, 7.2 | $AlCl_3 \cdot CH_3NO_2 \cdot$Toluene, 7.2 | $AlCl_3 \cdot CH_3NO_2 \cdot$Heptane, 7.2 | $AlCl_3 \cdot CH_3NO_2 \cdot$Heptane, 7.2. |
| Polymer weight, g | 12.3 | 11.3 | 0.0 | 0.0. |
| [¹] toluene, 23°C | 0.56 | 0.73 | | |

[1] Inherent viscosity measured in an Ubbelohde viscometer; compared to the viscosity of toluene at 23° C.
[2] Visual observation of an X-Ray Diffraction Diagram.

Run 1 illustrates the preparation of a polymer of chlorine-substituted ethyl vinyl ether. Runs 2 and 3 demonstrate the necessity of complexing the Friedel-Crafts type catalyst with an organic nitro compound in order to obtain an amorphous polymer product. Run 5 shows that an aliphatic polymerization solvent can be used if the catalyst complex is prepared in an aromatic solvent. Runs 6 and 7 show that the catalyst complex must be prepared in an aromatic solvent or no polymer is formed when the polymerization is carried out in either an aliphatic or an aromatic polymerization solvent.

EXAMPLE 2

The polymer prepared in Run 1 was compounded on a cold rubber roll mill according to the following cure recipe:

|  | Grams |
| --- | --- |
| Poly-2-chloroethyl vinyl ether | 20 |
| High abrasion furnace black | 10 |
| Stearic acid | 0.1 |
| Magnesium oxide | 1.0 |
| Hexamethylene diamine | 0.23 |

Portions of the compounded stock were cured at 280° F. for 15, 30, 60 and 120 minutes, respectively. Vulcanizate properties were obtained according to the standard ASTM method (D-412-51T) and are shown in Table II.

TABLE II

| Cure Time, Min. at 280° F. | Tensile, p.s.i. | Elongation, Percent |
| --- | --- | --- |
| 15 | 780 | 300 |
| 30 | 930 | 340 |
| 60 | 1,000 | 310 |
| 120 | 1,000 | 250 |

These results indicate that useful elastomeric product is produced by the practice of this invention.

Other typical correlations of monomers, solvent and catalyst are: hexyl vinyl ether, toluene, boron trifluoride-nitromethane-toluene; phenyl vinyl ether-heptane-aluminum chloride-nitrobenzene-toluene; cyclohexyl vinyl ether, cumene, gallium trichloride-nitroethane-cumene; and 4-chlorophenyl vinyl ether, xylene, aluminum bromide-nitromethane-xylene.

The invention having been described, it will be obvious that other modifications may be made consistent with the invention by those skilled in the art. It is intended by the following claims to cover such modifications and variations as are properly a part of this invention so far as permitted by the prior art.

What is claimed is:

1. A process for preparing an amorphous polymer of a vinyl ether compound which comprises:
   (a) admixing a Friedel-Crafts type catalyst with an organic nitro compound, in the presence of an aromatic solvent which is a liquid at a temperature of between about −100° C. and about room temperature, said nitro compound having the formula:

$$R'-NO_2$$

wherein R' is a $C_1$ to $C_{20}$ alkyl, cycloalkyl or aryl radical, the ratio of said catalyst to nitro compound being from about 0.1:1 to 10:1; and
   (b) polymerizing a vinyl ether compound in the presence of an aliphatic or aromatic solvent with the resultant catalyst complex of step (a) at a temperature of between about −100° C. and about room temperature, said vinyl ether compound having the formula:

$$R-O-CH=CH_2$$

wherein R is a $C_1$ to $C_{20}$ alkyl, cycloalkyl, aryl, alkaryl radical or halogen-substituted analogue thereof; and
   (c) recoving the resulting amorphous polymer from the reaction mixture.

2. The process according to claim 1 wherein the Friedel-Crafts type catalyst is aluminum chloride.
3. The process according to claim 1 wherein the organic nitro compound is nitromethane.
4. The process according to claim 1 wherein the aromatic solvent employed in preparing the catalyst complex in step (a) is toluene.
5. The process according to claim 1 wherein the vinyl ether compound is isopropyl vinyl ether.
6. The process according to claim 1 wherein the vinyl ether compound is isobutyl vinyl ether.
7. The process according to claim 1 wherein the vinyl ether compound is 2-chloroethyl vinyl ether.
8. A process for preparing a cured halogen-containing amorphous polymer of a halogen-containing vinylether compound which comprises:
   (a) admixing a Friedel-Crafts type catalyst with an organic nitro compound, in the presence of an aromatic solvent which is a liquid at a temperature of between about −100° C. and about room temperature, said nitro compound having the formula:

$$R'-NO_2$$

wherein R' is a $C_1$ to $C_{20}$ alkyl, cycloalkyl or aryl radical, the ratio of said catalyst to nitro compound being from about 0.1:1 to 10:1; and
   (b) polymerizing a halogen-containing vinyl ether compound in the presence of an aliphatic or aromatic solvent with the resultant catalyst complex of step (a) at a temperature of between about −100° C. and about room temperature, said halogen-containing vinyl ether compound having the formula:

$$R-O-CH=CH_2$$

wherein R is a halogen-containing $C_1$ to $C_{20}$ alkyl, cycloalkyl, aryl, alkaryl, aralkyl radical; and
   (c) recovering the resulting amorphous polymer from the reaction mixture; and
   (d) curing the resultant halogen-containing amorphous polymer with a hydrocarbon diamine.

9. The process according to claim 8 wherein the diamine is hexamethylene diamine.
10. A process for preparing a cured halogen-containing amorphous polymer from a vinyl ether compound which comprises:
    (a) admixing a Friedel-Crafts type catalyst with an organic nitro compound, in the presence of an aromatic solvent which is a liquid at a temperature of between about −100° C. and about room temperature, said nitro compound having the formula:

$$R'-NO_2$$

wherein R' is a $C_1$ to $C_{20}$ alkyl, cycloalkyl or aryl radical, the ratio of said catalyst to nitro compound being from about 0.1:1 to 10:1; and
    (b) polymerizing a halogen-containing vinyl ether compound in the presence of an aliphatic or aromatic solvent with the resultant catalyst complex of step (a) at a temperature of between about −100° C. and about room temperature, said halogen-containing vinyl ether compound having the formula:

$$R-O-CH=CH_2$$

wherein R is a halogen-containing $C_1$ to $C_{20}$ alkyl, cycloalkyl, aryl, alkaryl, or aralkyl radical; and
    (c) recovering the resulting amorphous polymer from the reaction mixture; and
    (d) modifying the resulting amorphous polymer by cleavage with a halogen acid so as to produce a halogen-containing amorphous polymer; and
    (e) curing the resulting halogen-containing amorphous polymer with a hydrocarbon diamine.

11. The process according to claim 10 wherein the halogen acid is hydroiodic acid.
12. The process according to claim 10 wherein the diamine is hexamethylene diamine.

References Cited

UNITED STATES PATENTS

| 3,047,555 | 7/1962 | Arquette | 260—91.1 |
| 3,080,352 | 3/1963 | Fishbein | 260—91.1 |

JOSEPH L. SHOFER, *Primary Examiner.*

M. B. KURTZMAN, *Assistant Examiner.*